United States Patent [19]
Takehara et al.

[11] Patent Number: 5,088,759
[45] Date of Patent: Feb. 18, 1992

[54] VEHICLE SUSPENSION SYSTEM

[75] Inventors: Shin Takehara; Toshiki Morita, both of Higashi-Hiroshima, Japan

[73] Assignee: Mazda Motor Corporation, Hiroshima, Japan

[21] Appl. No.: 522,785

[22] Filed: May 14, 1990

[30] Foreign Application Priority Data

May 17, 1989 [JP] Japan ................... 1-124061

[51] Int. Cl.⁵ ............................................. B60G 11/26
[52] U.S. Cl. .................................. 280/707; 280/810; 280/DIG. 1; 188/299
[58] Field of Search .......... 280/440, 6.1, 707, DIG. 1; 188/299; 364/424.25

[56] References Cited

U.S. PATENT DOCUMENTS

| | | | |
|---|---|---|---|
| 4,371,182 | 2/1983 | Brown | 280/6 |
| 4,625,993 | 12/1986 | Williams | 280/707 |
| 4,648,621 | 3/1987 | Yokoya et al. | 280/840 |
| 4,700,971 | 10/1987 | Dou et al. | 280/707 |
| 4,787,644 | 11/1988 | Yokote et al. | 280/840 |
| 4,801,155 | 1/1989 | Fukushima et al. | 280/840 |
| 4,803,627 | 2/1989 | Yasuuke et al. | 280/707 |
| 4,825,370 | 4/1989 | Kurosawa | 280/707 |
| 4,838,563 | 6/1989 | Kowishi et al. | 280/840 |

FOREIGN PATENT DOCUMENTS

| | | |
|---|---|---|
| 0114757 | 8/1984 | European Pat. Off. . |
| 0162449 | 11/1985 | European Pat. Off. . |
| 0234552 | 9/1987 | European Pat. Off. . |
| 0249246 | 12/1987 | European Pat. Off. . |
| 0260418 | 3/1988 | European Pat. Off. . |
| 62-96113 | 5/1987 | Japan . |

*Primary Examiner*—Kenneth R. Rice
*Attorney, Agent, or Firm*—Fleit, Jacobson, Cohn, Price, Holman & Stern

[57] ABSTRACT

A vehicle suspension system of the disclosure is provided with a cylinder device between a vehicle body member and a vehicle wheel member for the vehicle body member by which suspension characteristics are changed. The suspension characteristics are changed by controlling hydraulic fluid supply for the cylinder device, a vehicle height detecting device for detecting a vehicle height displacement, a vehicle height change rate detecting device for detecting a change rate of the vehicle height displacement, and a control device for receiving signals from both the vehicle height displacement detecting device and the vehicle height change rate detecting device to control the hydraulic fluid supply for the cylinder device. This hydraulic fluid supply is controlled in accordance with a vehicle height change rate gain in a manner that the change rate of the vehicle height displacement is suppressed a gain change device is also provided for changing the vehicle height change rate gain in accordance with a predetermined condition so as to change the control of the hydraulic fluid for the cylinder device. A desirable vehicle height displacement control can therefore, be accomplished.

9 Claims, 8 Drawing Sheets

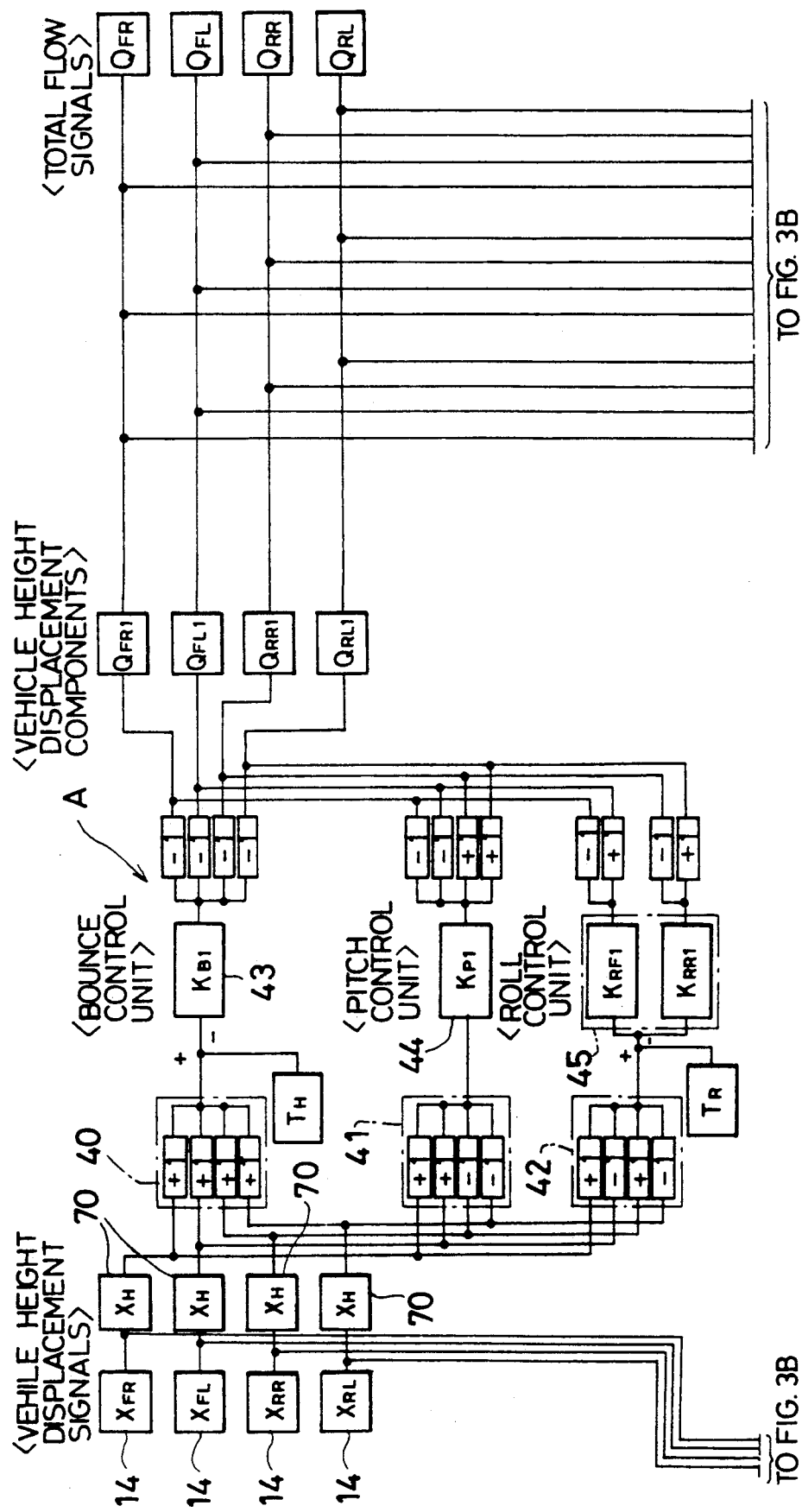

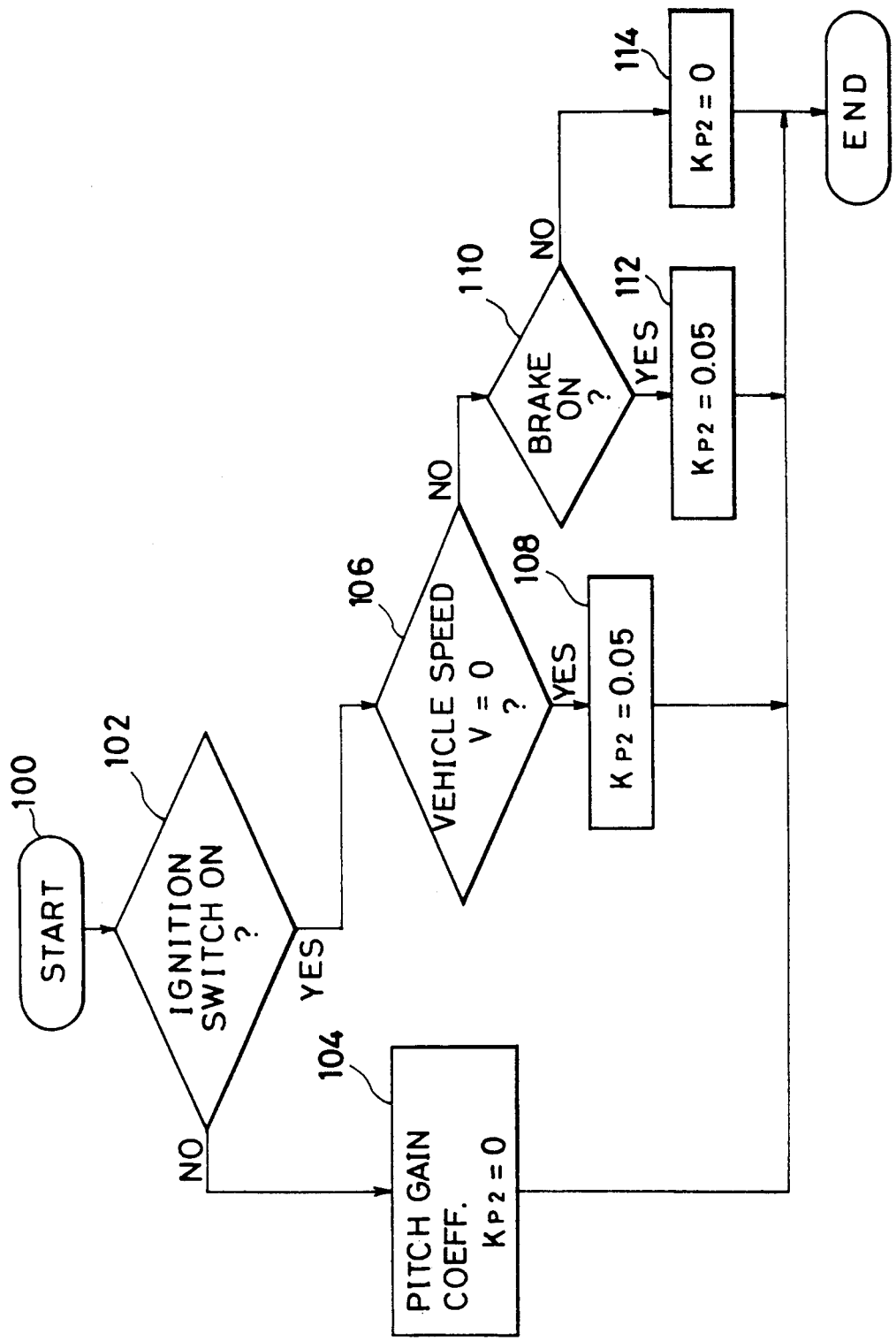

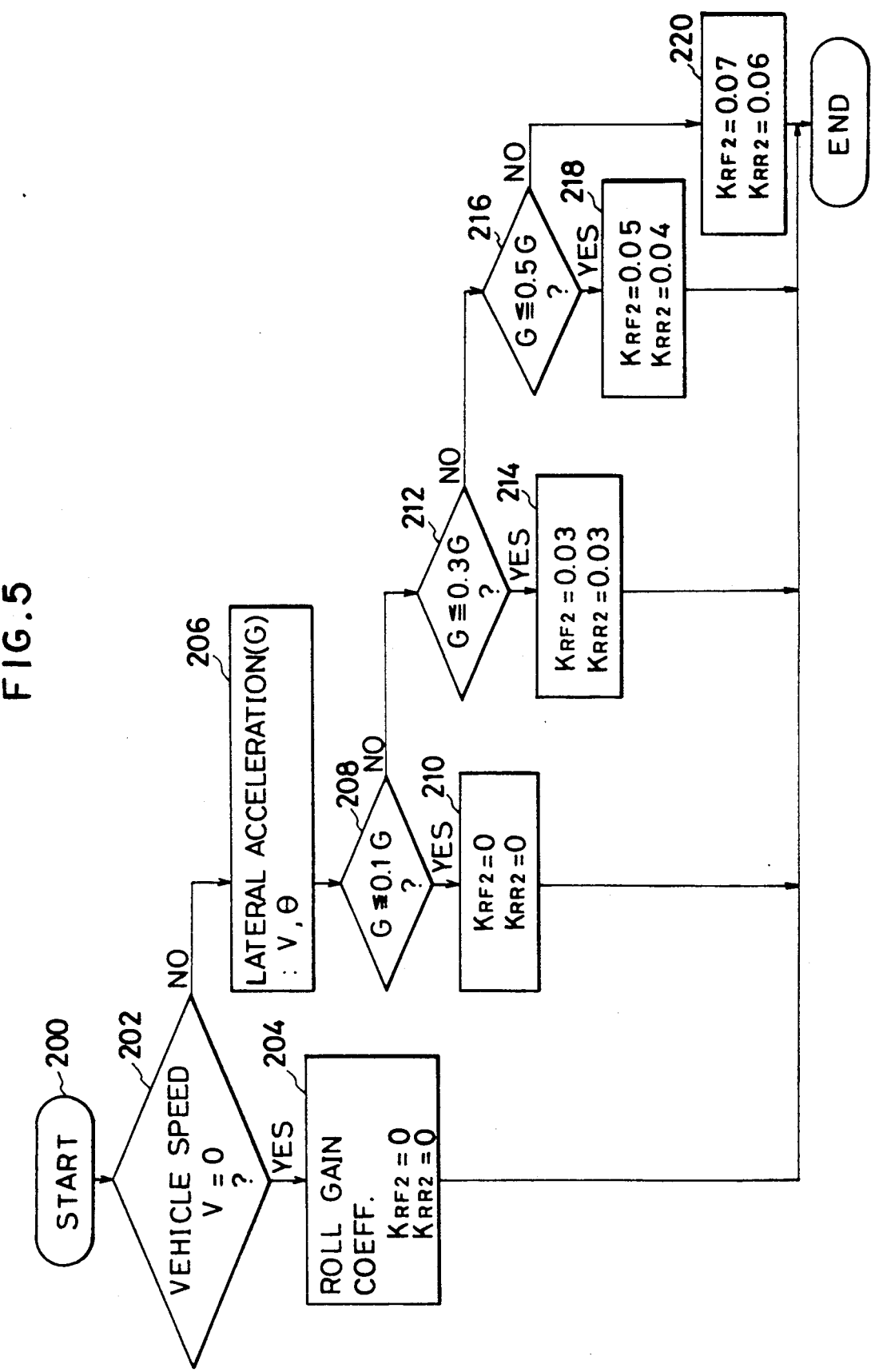

VEHICLE SUSPENSION SYSTEM

BACKGROUND OF THE INVENTION

1. Field of the Invention

This invention relates to a suspension system for a vehicle, and, in particular to an active suspension system.

2. Description of the Related Art

A conventional active suspension is disclosed in, for example, Japanese Laid-Open Patent No. 62-96113 published on May 2, 1987, European Patent Application published on Aug. 1, 1984 under publication number 0114757, and U.S. Pat. No. 4,371,182, issued on Feb. 1, 1983. In active suspensions as disclosed in the publications enumerated above, a cylinder device is provided for each vehicle wheel member between a vehicle body member and a vehicle wheel member. By controlling a supply of hydraulic fluid to the cylinder device, the hydraulic fluid in the amount of cylinder device can be changed so that the vehicle suspension characteristics are changed.

In the known active suspension systems, a vehicle height displacement is detected and a supply of hydraulic fluid to the cylinder device is controlled to get a target value of the vehicle height displacement. This is known as a vehicle height displacement control.

It should, however, be noted that this type of vehicle height displacement control, based on the detected vehicle height displacement, is not responsive. Thus, the control cannot accomplish a desirable vehicle height displacement control as the vehicle makes a quick movement.

As a result, a vehicle attitude may not be maintained properly. In addition, riding comfort is deteriorated.

In order to solve these problems, it is proposed that vehicle height displacement change rate be detected to control the hydraulic fluid introduced into the cylinder device to suppress the vehicle height displacement change rate ( vehicle height change rate control).

The vehicle height displacement control and the vehicle height change rate control are carried out independently. Therefore, both of the controls must be coordinated with each other for improving the suspension properties.

SUMMARY OF THE INVENTION

An object of the invention is, therefore to provide a vehicle suspension system in which both the vehicle height displacement control and the vehicle height change rate control are coordinated with each other to accomplish an improved riding comfort.

Another object of the present invention is to provide a responsive active suspension system for the vehicle.

The above object of the invention can be accomplished by a vehicle suspension system comprising a cylinder device provided between a vehicle body member and a vehicle wheel member for the vehicle body member in which suspension characteristics are changed by controlling hydraulic fluid supply for the cylinder device, vehicle height detecting means for detecting a vehicle height displacement, vehicle height change rate detecting means for detecting a change rate of the vehicle height displacement, control means for receiving signals from both the vehicle height displacement detecting means and the vehicle height change rate detecting means to control the hydraulic fluid supply for the cylinder device in accordance with a vehicle height change rate gain in a manner that the change rate of the vehicle height displacement is suppressed, and gain change means for changing the vehicle height change rate gain in accordance with a predetermined condition so as to change the control of the hydraulic fluid for the cylinder device.

According to the present invention, the vehicle height change rate gain is changed in accordance with the predetermined condition so that the supply control of the hydraulic fluid for the cylinder device is changed. Thus, both the vehicle height displacement control and the vehicle height change rate control are coordinated so as to be optimized.

As one of the features of the present invention, the vehicle height change rate gain may be changed in conditions such as when the vehicle is stopped, in a braking operation or in a steering operation.

The control means may be provided with a pitch control section and a rolling control section separately so as to control a pitching component of the change rate gain for the pitching control section and a rolling component of the change rate gain for the rolling control section independently.

The gain change means can change the pitching component and/or the rolling component of the vehicle height change rate gain.

BRIEF DESCRIPTION OF THE DRAWINGS

FIG. 3A through 3D are block diagrams illustrating control of suspension characteristics by a controller.

FIG. 4 and FIG. 5 are, respectively, a first flow chart and a second flow chart of the operation of a vehicle suspension system according to an embodiment of the invention.

DESCRIPTION OF THE PREFERRED EMBODIMENT

Figure 1:
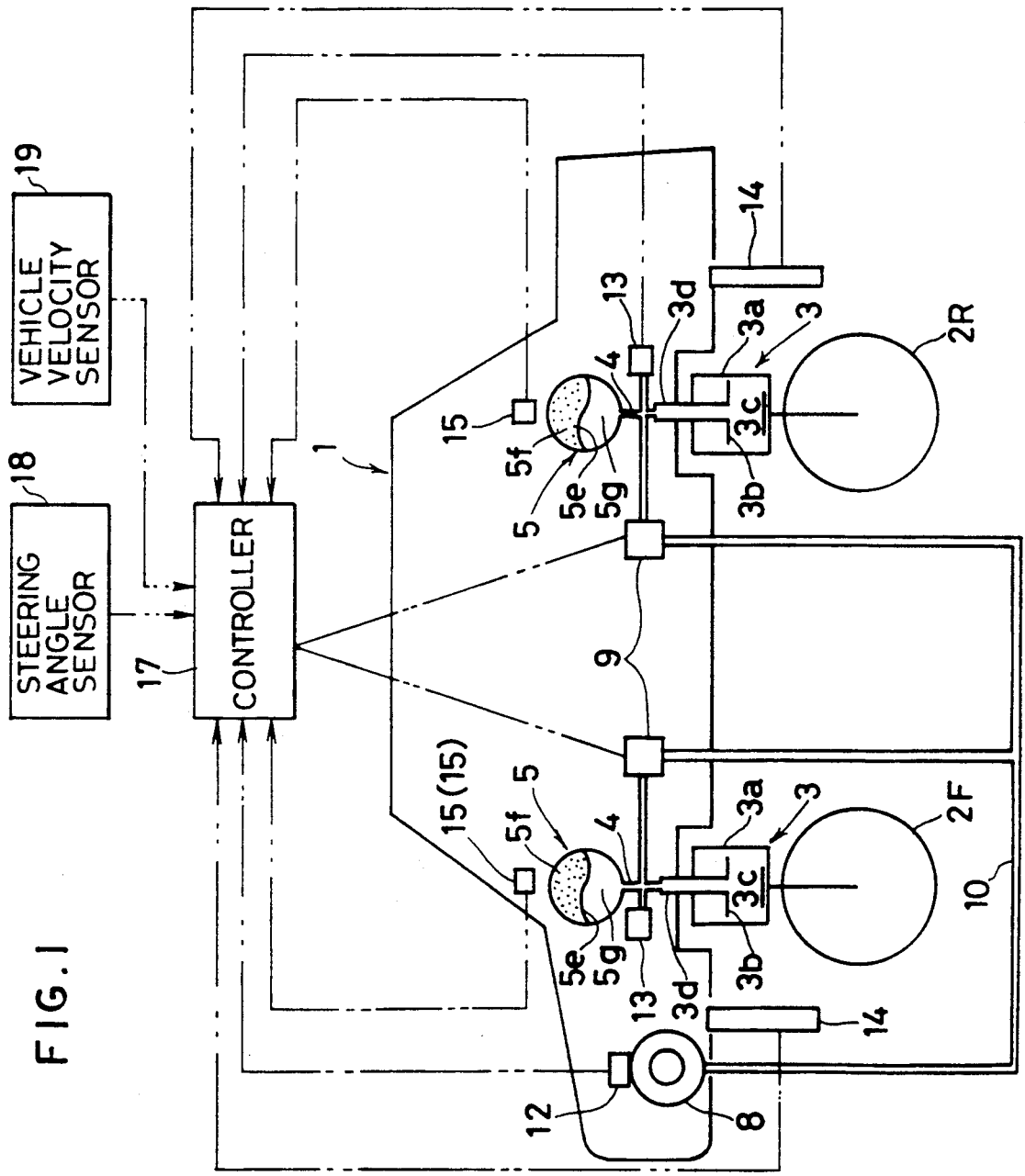
FIG. 1 is an overall schematic view of a vehicle.

FIG. 1 is an overall schematic view of a vehicle according to the invention. In FIG. 1, numeral 1 designates a vehicle body member or a vehicle body, and 2F and 2R, respectively, designate front and rear vehicle wheel members. Between vehicle body 1 and front wheels 2F, and between vehicle body 1 and rear wheels 2R are provided hydraulic cylinders 3 , 3 . A piston 3b inserted into each cylinder body 3a defines a fluid pressure chamber 3c inside each hydraulic cylinder 3. The upper end portion of a rod 3d connected to the piston 3b is connected to the vehicle body 1, and cylinder bodies 3a, 3a are connected to vehicle wheels 2F and 2R, respectively.

A gas spring 5 is connected to the fluid pressure chamber 3c of each hydraulic cylinder 3 through a communicating path 4. Each gas spring 5 is divided into a gas chamber 5f and a fluid pressure chamber 5g by a diaphragm 5e, and the fluid pressure room 5g is connected to the fluid pressure chamber 3c of the hydraulic cylinder 3 through the communicating path 4 and the piston 3b of the hydraulic cylinder 3.

Numeral 8 designates a hydraulic pump, and numerals 9, 9 designate proportional flow control valves connected to the hydraulic pump 8 through a fluid pressure path 10. These valves function to control fluid supply for the hydraulic cylinders 3, 3 .

Numeral 12 designates a discharge pressure gauge which senses the discharge pressure of the hydraulic pump 8, and numerals 13, 13 designate fluid pressure sensors which sense the fluid pressure of the fluid pressure chamber 3c in the hydraulic cylinders 3, 3. Numerals 14, 14 designate vehicle height sensors which sense the vehicle height displacement (cylinder stroke length), and numerals 15, 15, 15 designate vertical acceleration sensors which sense the vertical acceleration of the vehicle (spring acceleration of the wheels 2F, 2R). One of these vertical acceleration sensors 15, 15, 15 is provided above each of the right and left front wheels 2F within an approximately horizontal plane, and one is provided at the center of the vehicle in the widthwise direction between the rear wheels 2R. A total of three vertical acceleration sensors are provided.

Numerals 18, 19 designate a steering angle sensor and a vehicle speed sensor, respectively.

The signals from the above mentioned sensors are input to a controller 17, constituted of a central processing unit (CPU) and the like, which controls the proportional flow control valves 9, 9 so as to change the suspension characteristics.

Figure 2:
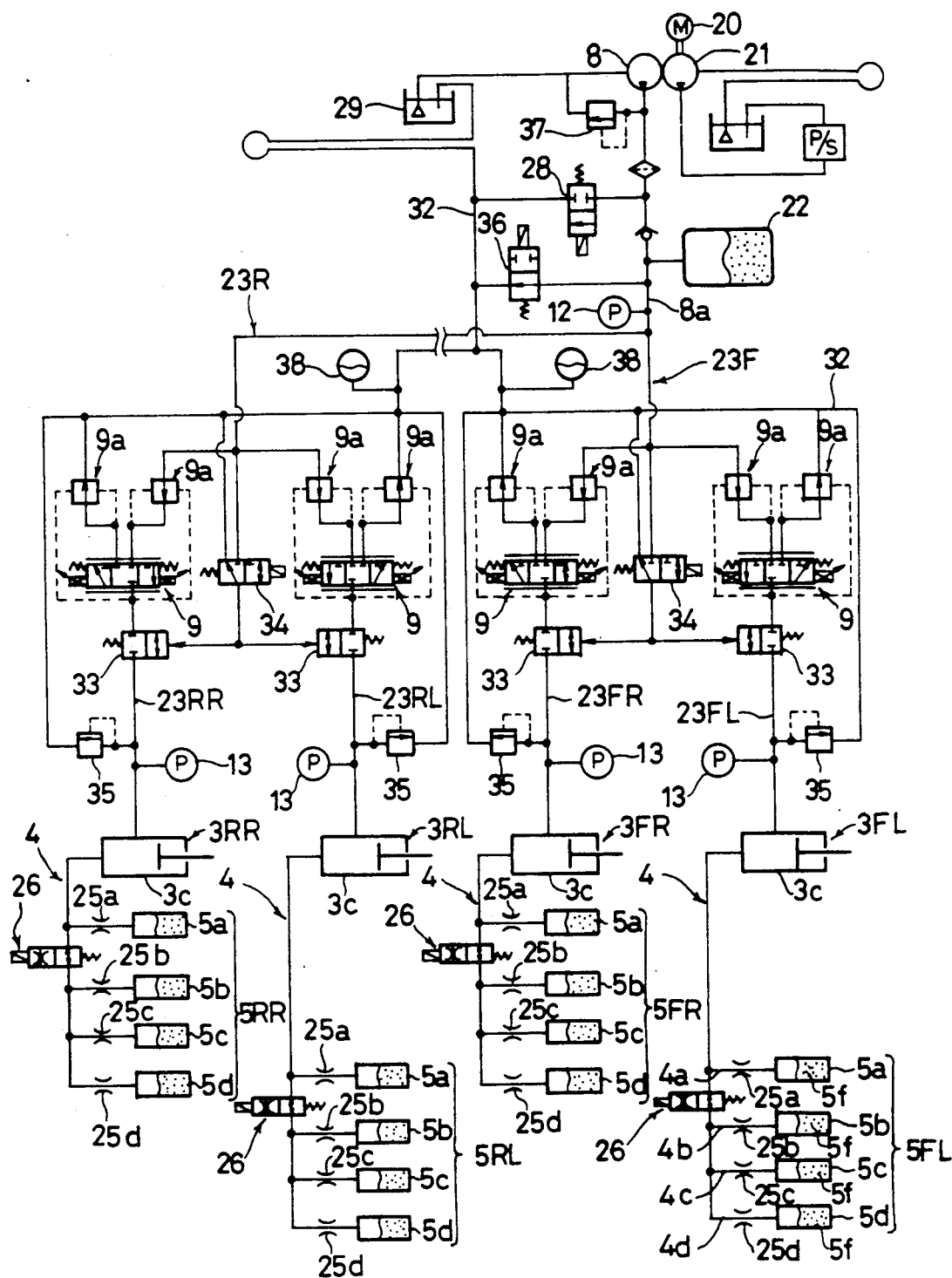
FIG. 2 is a circuit diagram of a hydraulic system for controlling fluid supply for hydraulic cylinder devices.

FIG. 2 shows a hydraulic circuit for supplying and discharging hydraulic fluid for the hydraulic cylinders 3.

As seen in FIG. 2, the hydraulic pump 8 is connected in tandem with a hydraulic pump 21 driven by a driving motor 20 for a power steering device. A discharge tube 8a has an accumulator 22 connected with an intermediate portion thereof, and a downstream portion of the discharge tube 8a branches off into a front wheel tube 23F and a rear wheel tube 23R. The front wheel tube 23F branches off into a left front wheel tube 23FL and a right front wheel tube 23FR, the downstream ends of which are connected with the fluid pressure chambers 3c, 3c of the hydraulic cylinders 3FL, 3FR.

Likewise, the rear wheel tube 23R branches off into a left wheel tube 23RL and a right wheel tube 23RR, the downstream ends of which are connected with the fluid pressure chambers 3c, 3c of the hydraulic cylinders 3RL, 3RR.

The gas spring devices 5FL through 5RR connected with the hydraulic cylinders 3FL through 3RR each has a plurality (four) of gas springs 5a, 5b, 5c, 5d which are connected through branch communicating paths 4a through 4d to a common communicating path 4 connected with the fluid pressure chamber 3c of the corresponding hydraulic cylinder 3. The branch communicating paths 4a through 4d of the plurality (first through fourth) gas springs 5a through 5d of each wheel have orifices 25a through 25d. The damping action by the orifices 25a through 25d and the buffer action of gas charged in the gas chambers 5f are combined to provide the basic function as a suspension system.

In the gas springs 5FL through 5RR of each vehicle wheel, a damping force switching valve 26, which switches the damping force by adjusting the path area of the communicating path 4, is provided on the common communicating path 4 between the first gas spring 5a and the second gas spring 5b. The switching valve 26 has two positions: an open position (shown in FIG. 2) opening the common communicating path 4 and a throttle position throttling the area of the common communicating path 4.

The discharge tube 8a of the hydraulic pump 8 has an unloader relief valve 28 with an open position and a closed position (shown in FIG. 2) connected near the accumulator 22. When the discharged fluid pressure measured by the discharge pressure gage 12 is greater than or equal to a preset upper limit value, the relief valve 28 is switched from the closed position shown in FIG. 2 to the open position, so the fluid in the hydraulic pump 8 is returned directly to a reserve tank 29, whereby the fluid accumulation pressure in the accumulator 22 is controlled to be maintained at a preset value. In above mentioned manner, the accumulated fluid of preset pressure from the accumulator 22 is supplied to the hydraulic cylinders 3.

As the left front wheel, the right front wheel, the left rear wheel and the right rear wheel are identical in configurations, only the left front wheel will be described in the following.

As explained above, the left front wheel tube 23FL is provided with the proportional flow control valve 9 which has three positions: a stopping position closing all ports (shown in FIG. 2), a supplying position where the left front wheel tube 23FL is opened to the supplying side, and a discharge portion where the hydraulic cylinder 3 of the left front wheel tube 23FL is connected through a return tube 32. The proportional flow control valve 9 is further provided with pressure-compensated valves 9a, 9a. The pressure-compensated valves 9a, 9a maintain the fluid pressure in the fluid pressure chamber 3c at a preset value when the proportional flow control valve 9 is positioned at either the supplying position or the discharge position.

On the hydraulic cylinder 3 side portion of the proportional flow control valve 9 is provided a pilot pressure active type switching valve 33 which opens and closes the left front tube 23FL. When a solenoid controlled valve 34 which introduces the pressurized fluid in the left front wheel tube 23F is at the open position, the fluid pressure of the solenoid controlled valve 34 is introduced as a pilot pressure to the switching valve 34. When the pilot pressure is more than or equal to a predetermined value, the switching valve 33 operates to open the left front wheel tube 23FL, so that the proportional flow control valve 9 can control the flow to the hydraulic cylinder 3.

The numeral 35 designates a relief valve which opens and operates to return the hydraulic fluid in the fluid pressure chamber 3c of the hydraulic cylinder 3 to the return tube 32 when the fluid pressure of the fluid pressure chamber 3c rises abnormally. The numeral 36 designates an ignition switch interlock valve connected near the accumulator 22 on the discharge tube 8a of the hydraulic pump 8. When the ignition switch is at its off position, the interlock valve 36 is controlled to open (shown in FIG. 2) so as to return the fluid in the accumulator 22 to the tank 29 and relieve the high pressure condition of the fluid. The numeral 37 designates a relief valve which returns fluid to the tank 29 and lowers the fluid pressure when the discharge pressure of the hydraulic pump 8 rises abnormally. The numerals 38, 38 designate return accumulators connected to the return tube 32 for accumulating the fluid discharged from the hydraulic cylinder 3.

Figure 3B:
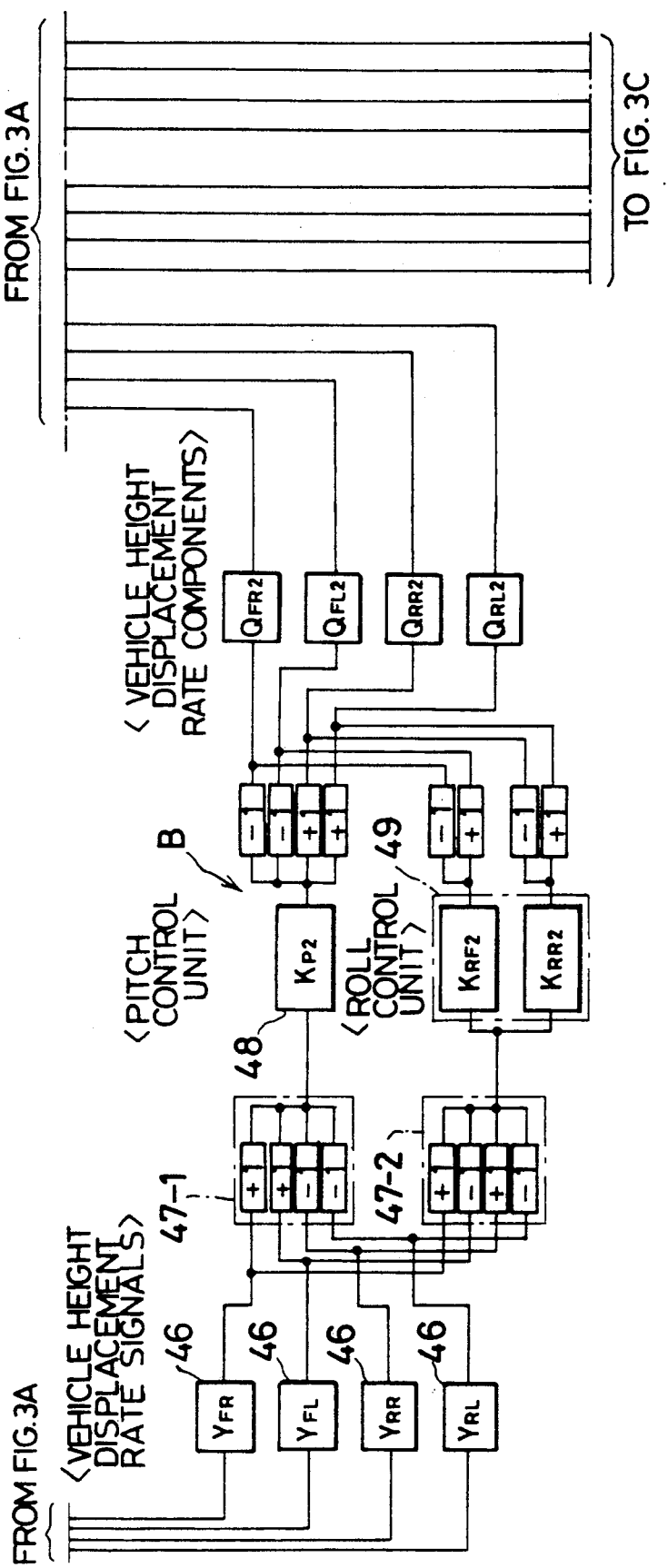
Figure 3C:
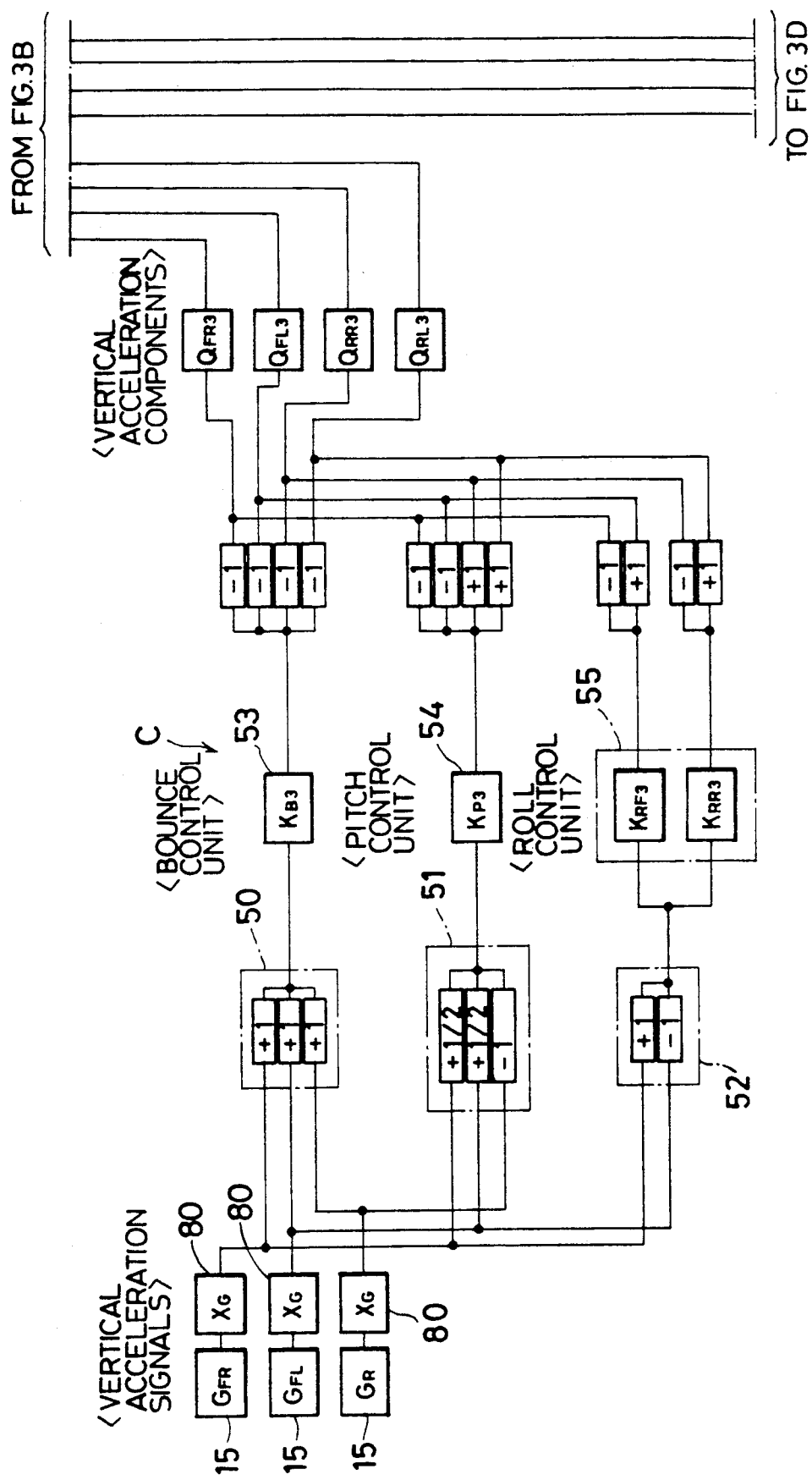
Figure 3D:
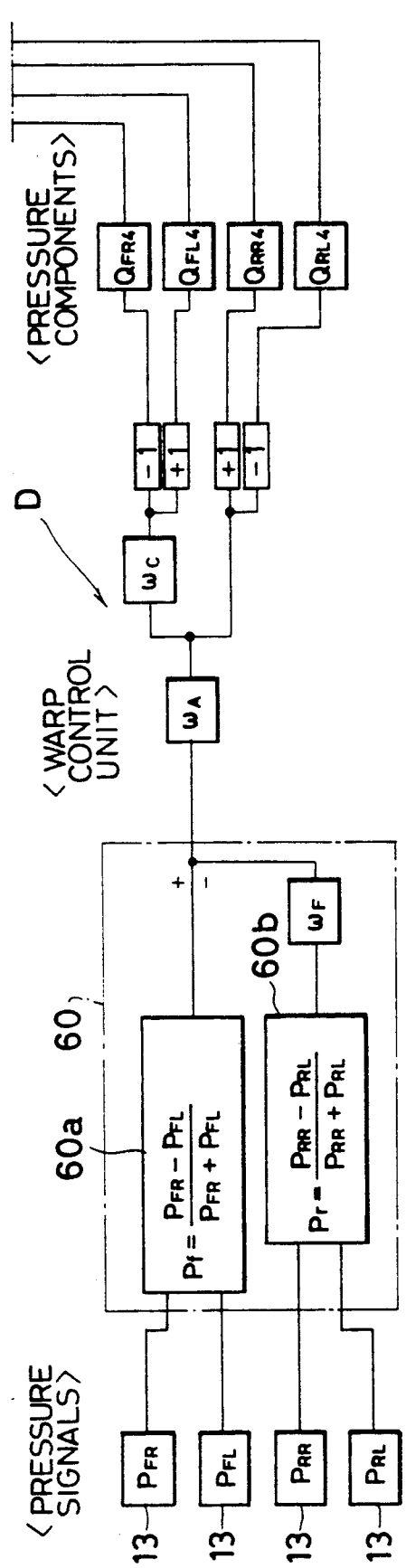

FIG. 3 is a block diagram illustrating control of suspension characteristics by a controller 17.

FIG. 3 shows a control system A for controlling the vehicle height to a desired value based on vehicle height displacement signals $X_{FR}$, $X_{FL}$, $X_{RR}$, $X_{RL}$ from the vehicle height sensors 14, 14, 14, 14 of the vehicle wheels, a control system B for suppressing vehicle height displacement rates based on the vehicle height displacement rate signals $Y_{FR}$, $Y_{FL}$, $Y_{RR}$, $Y_{RL}$ obtained from the vehicle height displacement signals, a control system C for lowering vertical vibration of the vehicle based on vertical acceleration signals $G_{FR}$, $G_{FL}$, $G_R$ of the three vertical acceleration sensors 15, 15, 15, and a control system D for supressing vehicle body warping computed from pressure signals $P_{FR}$, $P_{FL}$, $P_{RR}$, $P_{RL}$ of the fluid pressure sensors 13, 13, 13, 13 of the vehicle wheels.

First, in the control system A, numeral 40 designates a bounce component arithmetic unit which computes the vehicle bounce components by summing not only the outputs $X_{FR}$, $X_{FL}$ of the right and left front wheels 2F but also the outputs $X_{RR}$, $X_{RL}$ of the right and left rear wheels 2R from the vehicle height sensors 14, 14, 14, 14. Numeral 41 designates a pitch component arithmetic unit which computes the vehicle pitch components by subtracting the summed outputs $X_{RR}$, $X_{RL}$ of the right and left rear wheels 2R from summed outputs $X_{FR}$, $X_{FL}$ of the right and left front wheels 2F. Numeral 42 designates a roll component arithmetic unit which computes vehicle roll components by summing the difference $X_{FR}-X_{FL}$ of the outputs of the right and left front wheels 2F and the difference $X_{RR}-X_{RL}$ of the outputs of the right and left rear wheels 2R. Numeral 43 designates a bounce control unit which is input the vehicle bounce component computed in the bounce component arithmetic unit 40 and a desired average vehicle height $T_H$, and which computes controlled variables of the proportional flow control valves 9, 9, 9, 9 based on a gain coefficient $K_{B1}$ under bounce control. Numeral 44 designates a pitch component unit to which is input vehicle pitch components computed in the pitch component arithmetic unit 41 and which computes controlled variables of the proportional flow control valves 9, 9, 9, 9 based on a gain coefficient $K_{P1}$ under pitch control. Numeral 45 designates a roll control unit to which is input vehicle roll components computed in the roll component arithmetic unit 42 and a desired roll displacement $T_R$, and which computes controlled variables of the proportional flow control valves 9, 9, 9, 9 based on gain coefficients $K_{RF1}$, $K_{RR1}$ under roll control so as to level vehicle height corresponding to the desired roll displacement $T_R$.

For the purpose of controlling vehicle height to the desired value, the controlled variables computed in the above mentioned control units 43, 44, 45 are reversed with respect to the signs of the vehicle height displacement signals of vehicle height sensors 14, 14, 14,14. After that, each of the controlled bounce, pitch and roll variables for the vehicle wheels are added and flow signals $Q_{PR1}$, $Q_{FL1}$, $Q_{RR1}$, $Q_{RL1}$ of corresponding proportional flow control valves 9, 9, 9, 9 are obtained in the control system A.

Between the vehicle height sensors 14, 14, 14, 14 and the arithmetic units 40, 41, 42 are provided dead zone devices 70, 70, 70, 70, which output their vehicle height displacement signals $X_{FR}$, $X_{FL}$, $X_{RR}$, $X_{RL}$ only when the vehicle height displacement signals $X_{FR}$, $X_{FL}$, $X_{RR}$, $X_{RL}$ from the vehicle height sensors 14, 14, 14, 14 exceed the preset dead zone $X_H$.

Next, in the control system B, vehicle height displacement signals $X_{FR}$, $X_{FL}$, $X_{RR}$, $X_{RL}$ from the vehicle height sensors 14, 14, 14, 14, are input to differentiators 46, 46, 46, 46, by which differential components of the vehicle height displacement signals $X_{FR}$, $X_{FL}$, $X_{RR}$, $X_{RL}$, or vehicle height displacement rate signals $Y_{FR}$, $Y_{FL}$, $Y_{RR}$, $Y_{RL}$ are obtained.

Here, the vehicle height displacement rate is obtained by the following equation.

$$Y=(X_n=X_{n-1})/T$$

$X_n$: vehicle height at time t
$X_{n-1}$: vehicle height at time $t-1$
T: sampling time Numeral 47-1 designates a pitch component arithmetic unit which computes the vehicle pitch elements by subtracting the summation of the outputs $Y_{RR}$, $Y_{RL}$ of the right and left rear wheels 2R from summation of the outputs $Y_{FR}$, $Y_{FL}$ of the right and left front wheels 2F. Numeral 47-2 designates a roll element arithmetic unit which computes vehicle roll components by summing difference $Y_{FR}-Y_{FL}$ of the outputs of the right and left front wheels 2F and the difference $Y_{RR}-Y_{RL}$ of the outputs of the right and left rear wheels 2R.

Further numeral 48 designates a pitch control unit to which is input the vehicle pitch component computed in the pitch component arithmetic unit 47-1, and which computes controlled variables for the proportional flow control valves 9, 9, 9, 9 based on a gain coefficient $K_{P2}$ for changing the vehicle height displacement change rate gain under pitch control. Numeral 49 designates a roll control unit which is input vehicle roll components computed in the roll component arithmetic unit 47-2, and which computes controlled variables for the proportional flow control valves 9, 9, 9, 9 based on gain coefficients $K_{RF2}$, $K_{RR2}$ for changing the vehicle height displacement change rate gain under roll control.

Thus, each controlled variable computed in the above mentioned control units 48, 49 is reversed with respect to the signs of vehicle height displacement rate signals of the differentiators 46, 46, 46, 46. After that, the controlled pitch and roll variables of the vehicle wheels are added, and flow signals $Q_{FR2}$, $Q_{FL3}$, $Q_{RR2}$, $Q_{RL2}$ for the corresponding proportional flow control valves 9, 9, 9, 9 are obtained in the control system B.

Next in the control system C, numeral 50 designates a bounce component arithmetic unit which computes the vehicle bounce components by summing the outputs $G_{FR}$, $G_{FL}$, $G_R$ of the three vertical acceleration sensors 15, 15, 15. Numeral 51 designates a pitch component arithmetic unit which computes vehicle pitch components by subtracting the output $G_R$ of the rear wheel 2R from the summation of each half-value of outputs $G_{FR}$, $G_{FL}$ of the right and left front wheels 2F in the three vertical acceleration sensors 15, 15, 15. Numeral 52 designates a roll component arithmetic unit which computes vehicle roll components by subtracting the output $G_{FL}$ of the left front wheel from output $G_{FR}$ of the right front wheel.

Further, numeral 53 designates a bounce control unit to which is input vehicle bounce components computed in the bounce component arithmetic unit 50, and which computes controlled variables for the proportional flow control valves 9, 9, 9, 9 of the wheels based again on coefficient $K_{B3}$ under bounce control. Numeral 54 designates a pitch control unit to which is input vehicle pitch components computed in the pitch component arithmetic unit 51, and which computes controlled variables for the proportional flow control valves 9, 9, 9, 9 based on a gain coefficient $K_{P3}$ under pitch control. Numeral 55 designates a roll control unit to which is input vehicle roll components computed in the roll component arithmetic unit 52, and which computes controlled variables for the proportional flow control valves 9, 9, 9, 9 based on gain coefficients $K_{RF3}$, $K_{RR3}$ under roll control.

For the purpose of suppressing vehicle vertical vibration by the bounce components, pitch components, and roll components controlled variables in above mentioned control units 53, 54, 55 are reversed in sign in every wheel, and after that, each controlled bounce, pitch and roll variable in each vehicle wheel is added and flow signals $Q_{FR3}$, $Q_{FL3}$, $Q_{RR3}$, $Q_{RL3}$ for corresponding proportional flow control valves 9, 9, 9, 9 are obtained in the control system C.

Between the vertical acceleration sensors 15, 15, 15 and the arithmetic units 50, 51, 52 are provided dead zone devices 80, 80, 80, which output their vertical acceleration signals $G_{FR}$, $G_{FL}$, $G_R$ only when the vertical acceleration signals $G_{FR}$, $G_{FL}$, $G_R$ from the vertical acceleration sensors 15, 15, 15 exceed a preset dead zone $X_G$.

Next, in the control system D, a warp control unit 60 includes a fluid pressure ratio arithmetic unit 60a of the front wheel to which is input fluid pressure signals $P_{FR}$, $P_{FL}$ of the fluid pressure sensors 13, 13 of the two front wheels and computes the ratio $(R_{FR} - P_{FL})/(P_{FR} + P_{FL})$ of the right and left front wheel pressure difference $(P_{FR} - P_{FL})$ to the front wheel total fluid pressure $(P_{FR} + P_{FL})$, and a fluid pressure ratio arithmetic unit 60b of the rear wheel which similarily computes the fluid pressure ratio $(P_{RR} - P_{RL})/(P_{RR} + P_{RL})$ of the rear wheel. Then after the fluid pressure ratio of the rear wheel is multiplied by a gain coefficient $W_F$, the multiplied valve value is subtracted from the fluid pressure ratio of the front wheel, thus and the subtracted valve is multiplied by a gain coefficient $W_A$ and moreover is multiplied by a gain coefficient $W_C$ in the front wheel. After that, controlled variables for the wheels are reversed in sign for the purpose of being equalized between right and left wheels, so that flow signals $Q_{FR4}$, $Q_{RL4}$, $Q_{RR4}$, $Q_{RL4}$ of corresponding proportional flow control valves 9, 9, 9, 9 are obtained.

Thus, finally, total flow signals $Q_{FR}$, $Q_{FL}$, $Q_{RR}$, $Q_{RL}$ are obtained by summing vehicle height displacement components $Q_{FR1}$, $Q_{FL1}$, $Q_{RR1}$, $Q_{RL1}$, vehicle height displacement rate components $Q_{FR2}$, $Q_{FL2}$, $Q_{RR2}$, $Q_{RL2}$, vertical acceleration components $Q_{FR3}$, $Q_{FL3}$, $Q_{RR3}$, $Q_{RL3}$ and pressure components $Q_{FR4}$, $Q_{FL4}$, $Q_{RR4}$, $Q_{RL4}$.

Next, in the vehicle suspension system in accordance with the embodiment of the invention, each gain coefficient $K_{P2}$, $K_{RF2}$ and/or $K_{RF2}$ is changed in the control system B shown in FIG. 3, according to predetermined conditions, which are described in detail below.

FIG. 4 shows a first flow chart of a vehicle height control for the vehicle in which the gain coefficient $K_{P2}$ in the pitch control arithmetic unit is modified in accordance with the embodiment of the invention.

In FIG. 4, the procedure starts in step 100. If it is found in step 102 that the ignition switch is not turned on (the vehicle is in a parking condition), the step 104 is in turn carried out, in which the gain coefficient $K_{P2}$ is set at zero.

On the other hand, if it is found in the judgment in the step 102 that the ignition switch is turned on, the procedure goes to step 106. In step 106, if the vehicle speed V is zero (the vehicle is in a stop condition), the procedure goes to step 108 in which the gain coefficient $K_{P2}$ is set at a value of 0.05. Thus, when the vehicle speed is zero or the vehicle is in the stop condition, the gain coefficient $K_{P2}$ is increased to prevent a squatting action in which a rear portion of the vehicle squats in the starting operation.

In step 106, if the vehicle speed V is not zero or the vehicle is in a running condtion, step 110 is carried out. If it is judged in the step 110 that the vehicle is in a braking condition, step 112 is in turn carried out, in which the gain coefficient $K_{P2}$ is set at the value of 0.05. Thus, the gain coefficient $K_{P2}$ is increased in the braking condition so that a front poriton of the vehicle is prevented from squatting through the stopping operation of the vehicle.

In the step 110, if the brake is not operated, step 114 is carried out, in which the gain coefficient $K_{P2}$ is set at zero.

There is shown in FIG. 5 a second flow chart in which the gain coefficient $K_{PF2}$ and/or $K_{RR2}$ is modified.

The control starts at step 200. If it is found in step 202 that the vehicle speed v is zero (the vehicle is in the stop condition), the procedure goes to step 204 in which the gain coefficients concerning rolling of the vehicle $K_{RF2}$ and $K_{RR2}$ are set at zero.

In the case where the vehicle speed is not zero in the judgment of the step 202, the procedure goes to step 206 in which the lateral acceleration G is computed based on the vehicle speed V and the steering angle $\theta$. Then, the procedure goes to step 208. In the step 208, if it is found that the lateral acceleration G is not greater than a value of 0.1, step 210 is in turn carried out, in which the gain coefficients $K_{RR2}$ and $K_{RF2}$ are set at zero.

On the other hand, if the lateral acceleration G is greater than the value of 0.1, the procedure goes to step 212 in which a judgment is made as to whether or not the lateral acceleration G is not greater than a value of 0.3. If the judgment is yes, step 214 is carried out, in which the gain coefficients $K_{RR2}$ and $K_{RF2}$ are set at 0.03.

If the judgment in step 212 is no, step 216 is carried out, in which a judgment is made as to whether or not the leteral acceleration G is not geater than a value of 0.5. If the judgment in the step 216 is yes, step 218 is in turn carried out. On the other hand, if it is found in the step 216 that the lateral acceleration G is greater than the value of 0.5, step 220 is carried out. In the step 218, the gain coefficient $K_{RF2}$ is set at a value of 0.05 and the gain coefficient $K_{RR2}$ is set at a value of 0.04. In the step 220, the gain coefficient $K_{RF2}$ is set at a value of 0.07 and the gain coefficient $K_{RR2}$ is set at a value of 0.06.

As mentioned above, the gain coefficients $K_{RR2}$ and $K_{RF2}$ are increased as the lateral acceleration is increased so that the rolling movement can be suppressed and made as low as possible in the steering operation.

In the steps 204, 210 and 214, the gain coefficients $K_{RF2}$ and $K_{RR2}$ are set at the same values of 0, 0 and 0.03 respectively.

On the other hand, in the steps 218 and 220, the gain coefficient $K_{RF2}$ for the front wheels takes the values greater than the gain coefficient $K_{RR2}$ for the rear wheels. That is, in the step 218, the gain coefficient $K_{RR2}$ takes the value of 0.05 while the gain coefficient $K_{RR2}$ takes the value of 0.04. In the step 220, the gain coefficient $K_{RF2}$ takes the value of 0.07 while the gain coefficient $K_{RR2}$ takes the value of 0.06. This causes the vehicle to have an understeer tendency to improve driving stability.

What is claimed is:

1. A vehicle suspension system comprising:

a cylinder device provided between a vehicle body member and a vehicle wheel member for the vehicle body member in which suspension characteristics are changed by controlling hydraulic fluid supplied to the cylinder device, vehicle height detecting means for detecting a vehicle height displacement, vehicle height change rate detecting means for detecting a rate at which the vehicle height displacement changes, and control means for receiving signals from both the vehicle height detecting means and the vehicle height change rate detecting means to determine vehicle height change rate gain coefficients and control the hydraulic fluid supplied tot he cylinder device in accordance with said vehicle height change rate gain coefficients so that the rate at which the vehicle height displacement is changed is suppressed, said control means changing the vehicle height change rate gain coefficients in accordance with a vehicle operating condition so as to change the control of the hydraulic fluid supplied to the cylinder device by increasing at least one of said vehicle height change rate gain coefficients when the vehicle is stopped and starts running.

2. A vehicle suspension system according to claim 1, wherein said control means changes a pitch component of the vehicle height change rate gain coefficients.

3. A vehicle suspension system comprising:
a cylinder device provided between a vehicle body member and a vehicle wheel member for the vehicle body member in which suspension characteristics are changed by controlling hydraulic fluid supplied to the cylinder device, vehicle height detecting means for detecting a vehicle height displacement, vehicle height change rate detecting means for detecting a rate at which the vehicle height displacement changes, and control means for receiving signals from both the vehicle height detecting means and the vehicle height change rate detecting means to determine vehicle height change rate gain coefficients and control the hydraulic fluid supplied to the cylinder device in accordance with said vehicle height change rate gain coefficients so that the rate at which the vehicle height displacement is changed is suppressed, said control means changing the vehicle height change rate gain coefficients in accordance with a vehicle operating condition so as to change the control of the hydraulic fluid supplied to the cylinder device by increasing at least one of said vehicle height change rate gain coefficients when the vehicle is in a braking condition.

4. A vehicle suspension system according to claim 3, wherein said control means changes a pitch component of the vehicle height change rate gain coefficients.

5. A vehicle suspension system comprising:
a cylinder device provided between a vehicle body member and a vehicle wheel member for the vehicle body member in which suspension characteristics are changed by controlling hydraulic fluid supplied to the cylinder device, vehicle height detecting means for detecting a vehicle height displacement, vehicle height change rate detecting means for detecting a rate at which the vehicle height displacement changes, and control means for receiving signals from both the vehicle height detecting means and the vehicle height change rate detecting means to determine vehicle height change rate gain coefficients and control the hydraulic fluid supplied to the cylinder device in accordance with said vehicle height change rate gain coefficients so that the rate at which the vehicle height displacement is changed is suppressed, said control means changing the vehicle height change rate gain coefficients in accordance with a vehicle operating condition so as to change the control of the hydraulic fluid supplied to the cylinder device by increasing at least one of said vehicle height change rate gain coefficients when the vehicle is in a lateral acceleration condition.

6. A vehicle suspension system according to claim 5, wherein said control means changes a roll component of the vehicle height change rate gain coefficients.

7. A vehicle suspension system comprising:
a cylinder device provided between a vehicle body member and a vehicle wheel member for the vehicle body member in which suspension characteristics are changed by controlling hydraulic fluid supplied to the cylinder device, vehicle height detecting means for detecting a vehicle height displacement, vehicle height change rate detecting means for detecting a rate at which the vehicle height displacement changes, and control means for receiving signals from both the vehicle height detecting means and the vehicle height change rate detecting means to determine vehicle height change rate gain coefficients and control the hydraulic fluid supplied to the cylinder device in accordance with said vehicle height change rate gain coefficients so that the rate at which the vehicle height displacement is changed is suppressed, said control means changing the vehicle height change rate gain coefficients in accordance with a vehicle operating condition so as to change the control of the hydraulic fluid supplied to the cylinder device and being separately provided with a pitch control section and a roll control section, a pitch component for a pitch control of the vehicle height change rate gain coefficients being changed by the pitch control section, and a roll component for a roll control of the vehicle height change rate gain coefficients being changed by the roll control section, said pitch component and said roll component being changed independently.

8. A vehicle suspension system according to claim 7, wherein said control means changes the pitch component of the vehicle height change rate gain coefficients.

9. A vehicle suspension system according to claim 7, wherein said control means changes the roll component of the vehicle height change rate gain coefficients.

* * * * *